(12) United States Patent
Horiuchi

(10) Patent No.: US 12,494,514 B2
(45) Date of Patent: Dec. 9, 2025

(54) SECONDARY BATTERY

(71) Applicant: MURATA MANUFACTURING CO., LTD., Kyoto (JP)

(72) Inventor: Hiroshi Horiuchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 487 days.

(21) Appl. No.: 17/987,086

(22) Filed: Nov. 15, 2022

(65) Prior Publication Data

US 2023/0079429 A1 Mar. 16, 2023

Related U.S. Application Data

(63) Continuation of application No. PCT/JP2021/015970, filed on Apr. 20, 2021.

(30) Foreign Application Priority Data

May 21, 2020 (JP) .................. 2020-089157

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 50/105* (2021.01);
(Continued)

(58) Field of Classification Search
CPC .......... H01M 10/0587; H01M 50/121; H01M 50/136; H01M 50/105; H01M 50/0525; H01M 2220/30
See application file for complete search history.

(56) References Cited

U.S. PATENT DOCUMENTS

2006/0154138 A1* 7/2006 Miyamoto ........ H01M 10/0587
429/130
2011/0244318 A1* 10/2011 Cho .................... H01M 50/105
429/186
(Continued)

FOREIGN PATENT DOCUMENTS

CN 1988240 A 6/2007
CN 101107731 A * 1/2008 ............... A61L 2/10
(Continued)

OTHER PUBLICATIONS

Machine Translation of CN-101107731-A (May 16, 2025) (Year: 2025).*

(Continued)

*Primary Examiner* — Matthew J Merkling
(74) *Attorney, Agent, or Firm* — K&L Gates LLP

(57) ABSTRACT

A secondary battery includes an outer package member, a battery device, and an adhesive member. The outer package member has flexibility. The battery device is contained inside the outer package member, and includes a positive electrode and a negative electrode. The positive electrode and the negative electrode are opposed to each other and are wound. The adhesive member is disposed between the outer package member and the battery device. The adhesive member is adhered to each of the outer package member and the battery device. The positive electrode and the negative electrode are wound in such a manner that the positive electrode or the negative electrode is disposed in an outermost wind. The adhesive member includes a non-heat adhesive layer and a heat adhesive layer. The non-heat adhesive layer is adhered to the outer package member. The heat adhesive layer is adhered to the battery device and includes oriented polystyrene.

11 Claims, 5 Drawing Sheets

(51) Int. Cl.
*H01M 50/105* (2021.01)
*H01M 50/121* (2021.01)
*H01M 50/136* (2021.01)

(52) U.S. Cl.
CPC ....... *H01M 50/121* (2021.01); *H01M 50/136* (2021.01); *H01M 2220/30* (2013.01)

(56) References Cited

U.S. PATENT DOCUMENTS

| | | | |
|---|---|---|---|
| 2011/0287302 A1 | 11/2011 | Kim | |
| 2012/0115025 A1* | 5/2012 | Kim | H01M 10/0431 |
| | | | 429/186 |
| 2012/0279075 A1* | 11/2012 | Amsel | H01M 10/653 |
| | | | 30/526 |
| 2013/0280570 A1 | 10/2013 | Kim et al. | |
| 2015/0010797 A1 | 1/2015 | Kim | |
| 2015/0171383 A1* | 6/2015 | Ahn | H01M 50/434 |
| | | | 428/354 |
| 2017/0275506 A1 | 9/2017 | Sasaki | |
| 2017/0346130 A1 | 11/2017 | Maeda et al. | |
| 2018/0269472 A1* | 9/2018 | Ise | H01M 10/4207 |

FOREIGN PATENT DOCUMENTS

| | | | | |
|---|---|---|---|---|
| CN | 102549801 A | | 7/2012 | |
| CN | 111995957 A | * | 11/2020 | |
| EP | 1804320 A2 | * | 7/2007 | ................. C09J 7/20 |
| EP | 2273600 A1 | * | 1/2011 | ........ H01M 10/0431 |
| EP | 2273601 A1 | * | 1/2011 | ........ H01M 10/0431 |
| JP | 2011222469 A | | 11/2011 | |
| JP | 2011243553 A | | 12/2011 | |
| JP | 2015008140 A | | 1/2015 | |
| JP | 2015015236 A | | 1/2015 | |
| JP | 2015118921 A | | 6/2015 | |
| JP | 2016128561 A | | 7/2016 | |
| KR | 20090088761 A | * | 8/2009 | |
| WO | WO-03043105 A1 | * | 5/2003 | ........ H01M 10/0431 |
| WO | WO-2009139388 A1 | * | 11/2009 | ........ H01M 10/0431 |
| WO | 2016051674 A1 | | 4/2016 | |
| WO | 2016080143 A1 | | 5/2016 | |
| WO | 2018074773 A | | 4/2018 | |

OTHER PUBLICATIONS

Machine Translation of KR-20090088761-A (May 16, 2025) (Year: 2025).*
Machine Translation of WO-2009139388-A1 (May 16, 2025 (Year: 2025).*
International Search Report of corresponding PCT application PCT/JP2021/015970, dated Jun. 22, 2021.
Office Action issued for corresponding Chinese Patent Application No. 202180030140.1, dated Oct. 14, 2025. (4 pages.).
Search Report issued for corresponding Chinese Patent Application No. 202180030140.1, dated Oct. 13, 2025. (2 pages.).

* cited by examiner

SECONDARY BATTERY

CROSS REFERENCE TO RELATED APPLICATIONS

The present application is a continuation of PCT application no. PCT/JP2021/015970, filed on Apr. 20, 2021, which claims priority to Japanese patent application no. JP2020-089157, filed on May 21, 2020, the entire contents of which are herein incorporated by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolyte. A configuration of the secondary battery has been considered in various ways.

Specifically, in order to achieve a superior electrical characteristic, an electrode assembly and a casing are adhered to each other by an adhesive composition for an electrochemical device, and the adhesive composition has a core-shell structure (including two polymers that are different from each other in degree of swelling in electrolysis solution). In order to improve stability against an external impact, an oriented polystyrene film is attached to an outer surface of an electrode assembly. In order to fix an electrode assembly to a cylindrical can, a swelling tape for filling a gap is used, and the swelling tape for filling a gap includes: a substrate layer that deforms in a longitudinal direction when the substrate layer comes in contact with a liquid; and a pressure-sensitive adhesive layer formed on one surface of the base layer.

In order to prevent an electrode assembly from being released or moved inside a secondary battery, a seal tape is attached to an outer surface of the electrode assembly, and the seal tape includes: a first adhesive layer adhered to the electrode assembly; and a second adhesive layer (an oriented polystyrene (OPS) material) adhered to a battery case. In order to improve shock resistance, a jelly roll tape is used, and the jelly roll tape includes: an adhesive tape (an oriented polystyrene film) that exhibits an adhesive property as a result of reacting with an electrolytic solution; and an adhesive layer (a rubber-based adhesive layer) formed on one surface of the adhesive tape. In order to fix an electrode assembly to a battery case, an OPS (registered trademark) tape is used.

SUMMARY

The present application relates to a secondary battery.

Consideration has been given in various ways to improve performance of a secondary battery; however, the secondary battery still remains insufficient in physical durability. Accordingly, there is still room for improvement in terms thereof.

The present technology has been made in view of such an issue and relates to providing a secondary battery that is able to achieve superior physical durability according to an embodiment.

A secondary battery according to an embodiment of the present technology includes an outer package member, a battery device, and an adhesive member. The outer package member has flexibility. The battery device is contained inside the outer package member, and includes a positive electrode and a negative electrode. The positive electrode and the negative electrode are opposed to each other and are wound. The adhesive member is disposed between the outer package member and the battery device. The adhesive member is adhered to each of the outer package member and the battery device. The positive electrode and the negative electrode are wound in such a manner that the positive electrode or the negative electrode is disposed in an outermost wind. The adhesive member includes a non-heat adhesive layer and a heat adhesive layer. The non-heat adhesive layer is adhered to the outer package member. The heat adhesive layer is adhered to the battery device and includes oriented polystyrene.

Here, the "heat adhesive layer" is a layer that exhibits adhesion as a result of application of heat and pressure, and includes, as described above, oriented polystyrene. In contrast, the "non-heat adhesive layer" is a layer that exhibits adhesion without need for application of heat and pressure, and includes a common adhesive material that exhibits adhesion at an ambient temperature and an ambient pressure.

According to the secondary battery of an embodiment of the present technology: the battery device including the positive electrode and the negative electrode that are opposed to each other and are wound is contained inside the outer package member having flexibility; the adhesive member is adhered to each of the outer package member and the battery device; the positive electrode and the negative electrode are wound in such a manner that the positive electrode or the negative electrode is disposed in the outermost wind; and the adhesive member includes the non-heat adhesive layer adhered to the outer package member and the heat adhesive layer (oriented polystyrene) adhered to the battery device. Accordingly, it is possible to achieve superior physical durability.

Note that effects of the present technology are not necessarily limited to those described herein and may include any of a series of suitable in relation to the present technology.

DETAILED DESCRIPTION

One or more embodiments of the present technology are described below in further detail including with reference to the drawings.

A description is given first of a secondary battery according to an embodiment of the present technology.

The secondary battery to be described here is a secondary battery that obtains a battery capacity using insertion and extraction of an electrode reactant, and includes a positive electrode, a negative electrode, and an electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
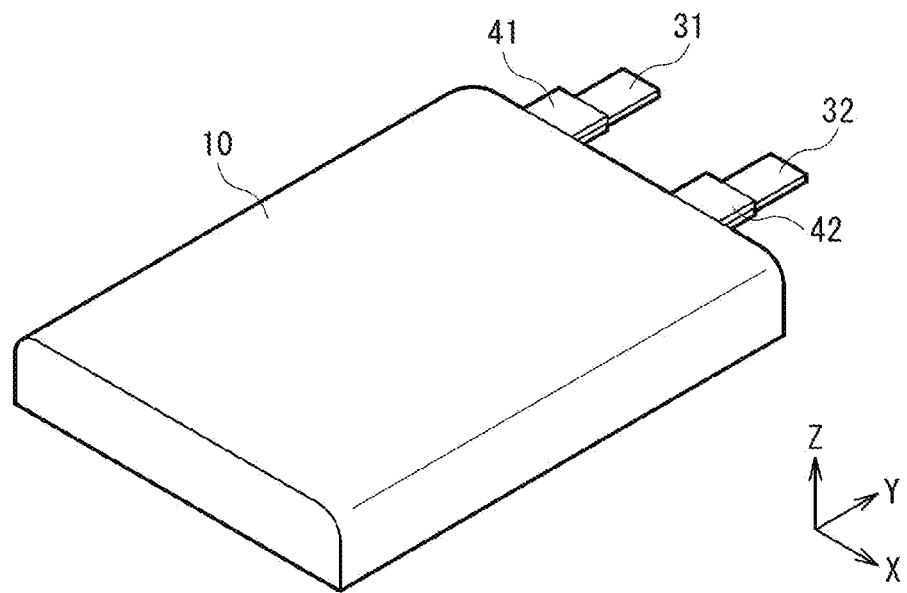
FIG. 1 is a perspective view of a configuration of a secondary battery according to an embodiment of the present technology.
Figure 2:
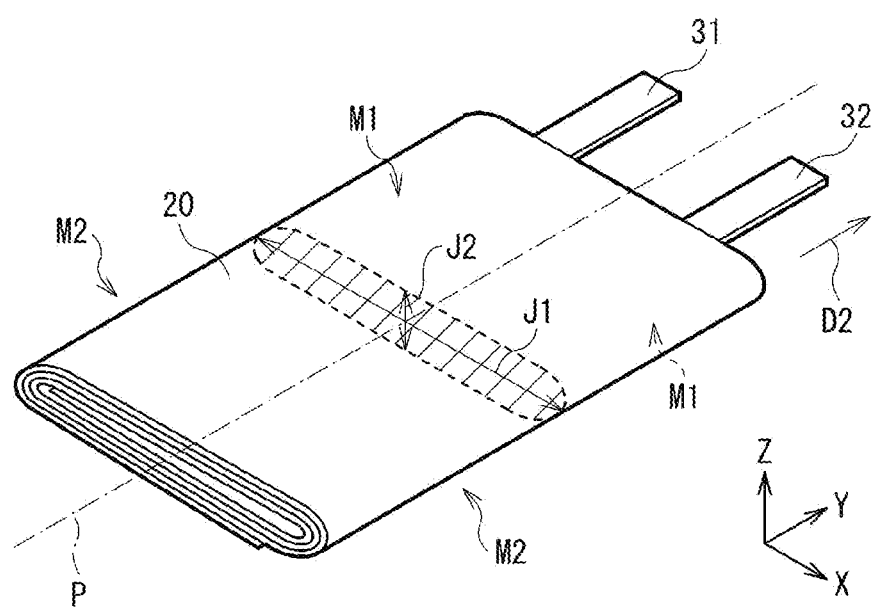
FIG. 2 is a perspective view of a configuration of a battery device.
Figure 3:
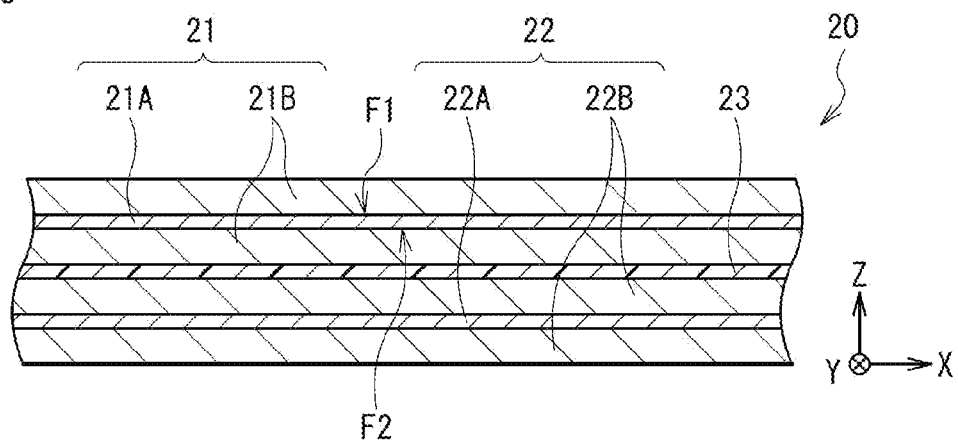
FIG. 3 is an enlarged sectional view of the configuration of the battery device illustrated in FIG. 2.
Figure 4:
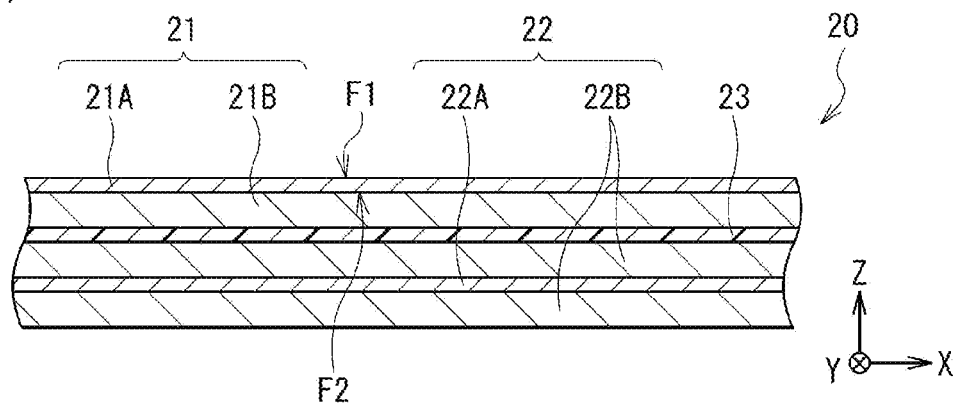
FIG. 4 is another enlarged sectional view of the configuration of the battery device illustrated in FIG. 2.
Figure 5:
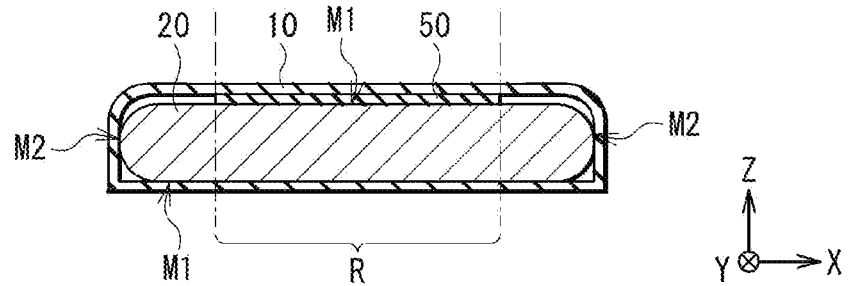
FIG. 5 is a sectional view of the configuration of the secondary battery illustrated in FIG. 1.
Figure 6:
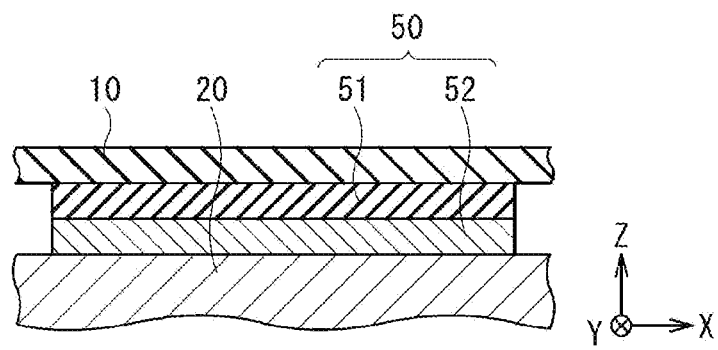
FIG. 6 is an enlarged sectional view of a configuration of a main part of the secondary battery illustrated in FIG. 5.

FIG. 1 illustrates a perspective configuration of the secondary battery. FIG. 2 illustrates a perspective configuration of a battery device 20. FIGS. 3 and 4 each illustrate an enlarged view of a sectional configuration of the battery device 20 illustrated in FIG. 2. FIG. 5 illustrates a sectional configuration of the secondary battery illustrated in FIG. 1. FIG. 6 illustrates a sectional configuration of a main part of the secondary battery illustrated in FIG. 5.

Note that FIG. 2 illustrates a positive electrode lead 31 and a negative electrode lead 32 together with the battery device 20, and also illustrates a section of the battery device 20 along an XZ plane with a dashed line.

FIG. 3 illustrates a section of a portion in the middle of winding of the battery device 20, and FIG. 4 illustrates a section of a portion of an outermost wind of the battery device 20. Note that, in each of FIGS. 3 and 4, an upper side is an outer side of the winding (a side farther from a winding axis P to be described later), and a lower side is an inner side of the winding (a side closer to the winding axis P).

FIG. 5 illustrates a section of the secondary battery along the XZ plane. FIG. 6 illustrates an adhesive tape 50 together with respective portions of an outer package film 10 and the battery device 20.

As illustrated in FIGS. 1 to 6, the secondary battery includes the outer package film 10, the battery device 20, the positive electrode lead 31, the negative electrode lead 32, sealing films 41 and 42, and the adhesive tape 50. The secondary battery described here is a secondary battery of a laminated-film type. The secondary battery of the laminated-film type includes, as an outer package member to contain the battery device 20, the outer package film 10 having flexibility or softness.

As illustrated in FIGS. 1 and 5, the outer package film 10 is the outer package member having flexibility that contains the battery device 20, and has a pouch-shaped structure which seals the battery device 20 in a state in which the battery device 20 is contained inside the outer package film 10. The outer package film 10 thus contains a positive electrode 21, a negative electrode 22, and an electrolytic solution which are to be described later.

A three-dimensional shape of the outer package film 10 is not particularly limited, and specifically corresponds to a three-dimensional shape of the battery device 20. Here, the three-dimensional shape of the outer package film 10 is an elongated, substantially rectangular parallelepiped which corresponds to the three-dimensional shape of the battery device 20 having an elongated shape to be described later.

The outer package film 10 is not particularly limited in configuration (materials, the number of layers, etc.), and may be single-layered or multi-layered. Here, the outer package film 10 is a three-layer laminated film including a fusion-bonding layer, a metal layer, and a surface protective layer that are stacked in this order from an inner side. The fusion-bonding layer includes a polymer compound such as polypropylene. The metal layer includes a metal material such as aluminum. The surface protective layer includes a polymer compound such as nylon.

The sealing film 41 is interposed between the outer package film 10 and the positive electrode lead 31. The sealing film 42 is interposed between the outer package film 10 and the negative electrode lead 32. Note that the sealing films 41 and 42 may each be omitted.

The sealing film 41 is a sealing member that prevents entry of outside air into the outer package film 10. The sealing film 41 includes a polymer compound, such as polyolefin, that has adherence to the positive electrode lead 31. Examples of the polyolefin include polypropylene.

A configuration of the sealing film 42 is similar to that of the sealing film 41 except that the sealing film 42 is a sealing member that has adherence to the negative electrode lead 32. In other words, the sealing film 42 includes a polymer compound, such as polyolefin, that has adherence to the negative electrode lead 32.

As illustrated in FIGS. 2 to 5, the battery device 20 is an electric power generating device, and includes the positive electrode 21, the negative electrode 22, a separator 23, and the electrolytic solution (not illustrated) which is a liquid electrolyte. The battery device 20 is contained inside the outer package film 10.

The battery device 20 is a so-called wound electrode body. That is, in the battery device 20, the positive electrode 21 and the negative electrode 22 are stacked on each other with the separator 23 interposed therebetween, and the stack of the positive electrode 21, the negative electrode 22, and the separator 23 is wound about the winding axis P. Accordingly, the positive electrode 21 and the negative electrode 22 are opposed to each other with the separator 23 interposed therebetween, and are wound. The winding axis P is a virtual axis extending in a Y-axis direction.

Here, the positive electrode 21 and the negative electrode 22 are wound in such a manner that the positive electrode 21 is disposed in the outermost wind. In other words, in the battery device 20 which is the wound electrode body, neither the negative electrode 22 nor the separator 23 is disposed in the outermost wind, and the positive electrode 21 is disposed in the outermost wind. The adhesive tape 50 interposed between the outer package film 10 and the battery device 20 is thus adhered to the positive electrode 21 of the battery device 20.

The three-dimensional shape of the battery device 20 is not particularly limited. Here, the battery device 20 has an elongated shape. Thus, the battery device 20 has: two flat surfaces M1 that are opposed to each other; and two curved surfaces M2 that are opposed to each other with the two flat surfaces M1 in between. The flat surface M1 is a substantially-flat outer surface of the battery device 20, and the curved surface M2 is a convexly curved outer surface of the battery device 20.

Thus, a section of the battery device 20 intersecting the winding axis P, that is, the section of the battery device 20 along the XZ plane, has an elongated shape defined by a major axis J1 and a minor axis J2. The major axis J1 is a virtual axis extending in an X-axis direction and is larger in length than the minor axis J2. The minor axis J2 is a virtual axis extending in a Z-axis direction intersecting the X-axis direction and is smaller in length than the major axis J1. Here, the battery device 20 has an elongated cylindrical three-dimensional shape. The section of the battery device 20 thus has an elongated, substantially elliptical shape.

As illustrated in FIGS. 3 and 4, the positive electrode 21 includes a positive electrode current collector 21A and a positive electrode active material layer 21B.

The positive electrode current collector 21A has two opposed surfaces (a surface F1 on the outer side of the winding and a surface F2 on the inner side of the winding) on each of which the positive electrode active material layer 21B is to be provided. The positive electrode current collector 21A includes an electrically conductive material such as a metal material. Examples of the metal material include aluminum.

The positive electrode active material layer 21B is provided on each of the surface F1 on the outer side of the winding and the surface F2 on the inner side of the winding. The positive electrode active material layer 21B includes one or more of positive electrode active materials into which lithium is insertable and from which lithium is extractable. Note that the positive electrode active material layer 21B may further include, for example, a positive electrode binder and a positive electrode conductor. A method of forming the positive electrode active material layer 21B is not particularly limited, and specifically includes, for example, a coating method.

The positive electrode active material includes a lithium compound. The lithium compound is a generic term for a compound including lithium as a constituent element, and more specifically, for example, a compound including lithium and one or more transition metal elements as constituent elements. A reason for this is that a high a high energy density is obtainable. Note that the lithium compound may further include one or more of other elements (excluding lithium and transition metal elements). Although not particularly limited in kind, the lithium compound is specifically, for example, an oxide, a phosphoric acid compound, a silicic acid compound, or a boric acid compound. Specific examples of the oxide include $LiNiO2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

Here, as described above, the positive electrode 21 is disposed in the outermost wind of the battery device 20. Thus, in the positive electrode 21 of the outermost wind, the positive electrode active material layer 21B is provided only on the surface F2 on the inner side of the winding, out of the two opposed surfaces (the surface F1 on the outer side of the winding and the surface F2 on the inner side of the winding) of the positive electrode current collector 21A. In other words, in the positive electrode 21 of the outermost wind, no positive electrode active material layer 21B is provided on the surface F1 on the outer side of the winding, and the positive electrode current collector 21A (the surface F1 on the outer side of the winding) is thus exposed, whereas the positive electrode active material layer 21B is provided on the surface F2 on the inner side of the winding, and the positive electrode current collector 21A (the surface F2 on the inner side of the winding) is thus unexposed.

A reason why no positive electrode active material layer 21B is provided on the surface F1 on the outer side of the winding is that the following advantages are obtainable as compared with a case where the positive electrode active material layer 21B is provided on the surface F1 on the outer side of the winding. Firstly, the adhesive tape 50 is adhered not to the positive electrode active material layer 21B but to the positive electrode current collector 21A (the surface F1 on the outer side of the winding), which makes it easier for the adhesive tape 50 to be adhered to the battery device 20. In addition, a total thickness of the positive electrode 21 decreases, and an outer diameter of the battery device 20 thus decreases. This increases the number of winds of each of the positive electrode 21 and the negative electrode 22, and thus increases energy density per unit volume of the secondary battery.

A reason why the positive electrode active material layer 21B is provided on the surface F2 on the inner side of the winding is that the positive electrode current collector 21A (the surface F2 on the inner side of the winding) is closely attached to the separator 23 via the positive electrode active material layer 21B as compared with a case where no positive electrode active material layer 21B is provided on the surface F2 on the inner side of the winding. This prevents winding displacement of the positive electrode 21 of the outermost wind from occurring easily when the secondary battery undergoes a shock upon being dropped, for example.

It is sufficient that a range over which no positive electrode active material layer 21B is provided on the surface F1 on the outer side of the winding is greater than or equal to a range of one wind from an outermost winding end of the positive electrode 21. Thus, the range over which no positive electrode active material layer 21B is provided may be limited to the range of one wind from the outermost winding end of the positive electrode 21, or may be larger than the range of one wind from the outermost end of the positive electrode 21. Examples of the "range larger than the range of one wind from the outermost end" include, without limitation, a range of 1.5 winds and a range of 2 winds.

As illustrated in FIGS. 3 and 4, the negative electrode 22 includes a negative electrode current collector 22A and a negative electrode active material layer 22B.

The negative electrode current collector 22A has two opposed surfaces (a surface on the outer side of the winding and a surface on the inner side of the winding) on each of which the negative electrode active material layer 22B is to be provided. The negative electrode current collector 22A includes an electrically conductive material such as a metal material. Examples of the metal material include copper.

The negative electrode active material layer 22B is provided on each of the surface on the outer side of the winding of the negative electrode current collector 22A and the surface on the inner side of the winding of the negative electrode current collector 22A. The negative electrode active material layer 22B includes one or more of negative electrode active materials into which lithium is insertable and from which lithium is extractable. Note that the negative electrode active material layer 22B may further include, for example, a negative electrode binder and a negative electrode conductor. Details of the negative electrode binder are similar to those of the positive electrode binder. Details of the negative electrode conductor are similar to those of the positive electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The negative electrode active material includes a carbon material, a metal-based material, or both. A reason for this is that a high energy density is obtainable. Examples of the carbon material include graphitizable carbon, non-graphitizable carbon, and graphite (natural graphite and artificial graphite). The metal-based material is a material that includes, as a constituent element or constituent elements, one or more elements among metal elements and metalloid elements that are each able to form an alloy with lithium. Such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq2$ or $0.2<x<1.4$).

Here, as described above, not the negative electrode 22 but the positive electrode 21 is disposed in the outermost wind of the battery device 20. Accordingly, in the negative electrode 22 in the outermost wind that is opposed to the positive electrode 21 of the outermost wind with the separator 23 interposed therebetween, the negative electrode active material layer 22B is provided on each of the surface on the outer side of the winding of the negative electrode current collector 22A and the surface on the inner side of the winding of the negative electrode current collector 22A.

The separator 23 is an insulating porous film interposed between the positive electrode 21 and the negative electrode 22 as illustrated in FIGS. 3 and 4, and allows lithium ions to pass therethrough while preventing contact (a short circuit) between the positive electrode 21 and the negative electrode 22. The separator 23 includes a polymer compound such as polyethylene.

The electrolytic solution includes a solvent and an electrolyte salt. The positive electrode 21, the negative electrode 22, and the separator 23 are each impregnated with the electrolytic solution.

The solvent includes one or more of non-aqueous solvents (organic solvents) including, without limitation, a carbonic-acid-ester-based compound, a carboxylic-acid-ester-based compound, and a lactone-based compound. An electrolytic solution including the non-aqueous solvent is a so-called non-aqueous electrolytic solution. The electrolyte salt includes one or more of light metal salts including, without limitation, a lithium salt.

As illustrated in FIGS. 1 and 2, the positive electrode lead 31 is a positive electrode terminal coupled to the battery device 20 (the positive electrode 21). More specifically, the positive electrode lead 31 is coupled to the positive electrode current collector 21A. The positive electrode lead 31 is led out from an inside to an outside of the outer package film 10, and includes an electrically conductive material such as aluminum. A shape of the positive electrode lead 31 is not particularly limited. Specifically, the positive electrode lead 31 has a shape such as a thin plate shape or a meshed shape.

As illustrated in FIGS. 1 and 2, the negative electrode lead 32 is a negative electrode terminal coupled to the battery device 20 (the negative electrode 22). More specifically, the negative electrode lead 32 is coupled to the negative electrode current collector 22A. The negative electrode lead 32 is led out from the inside to the outside of the outer package film 10, and includes an electrically conductive material such as copper. Here, a direction in which the negative electrode lead 32 is led out is similar to that in which the positive electrode lead 31 is led out. Note that details of a shape of the negative electrode lead 32 is similar to those of the shape of the positive electrode lead 31.

As illustrated in FIGS. 5 and 6, the adhesive tape 50 is a tape-shaped fixing member that fixes the battery device 20 to the outer package film 10. The adhesive tape 50 is disposed between the outer package film 10 and the battery device 20, and is adhered to each of the outer package film 10 and the battery device 20.

A range of provision (an area of provision) of the adhesive tape 50 is not particularly limited, and may thus be set as desired. The area of provision of the adhesive tape 50 is an area of adhesion of the adhesive tape 50 to the outer package film 10, and is also an area of adhesion of the adhesive tape 50 to the battery device 20. A planar shape of the adhesive tape 50 (i.e., a shape of the adhesive tape 50 as viewed in the Z-axis direction) is not particularly limited, and may thus be a rectangular shape or any other shape.

The adhesive tape 50 includes a non-heat adhesive layer 51 and a heat adhesive layer 52 that are stacked on each other. Note that: the non-heat adhesive layer 51 faces the outer package film 10, and is thus adhered to the outer package film 10; and the heat adhesive layer 52 faces the battery device 20, and is thus adhered to the battery device 20.

Here, as described above, the positive electrode 21 is disposed in the outermost wind of the battery device 20, and the positive electrode current collector 21A (the surface F1 on the outer side of the winding) is exposed in the positive electrode 21 of the outermost wind. The heat adhesive layer 52 of the adhesive tape 50 is thus adhered to the positive electrode current collector 21A.

As described above, the non-heat adhesive layer 51 is a layer that exhibits adhesion without need for application of heat and pressure. Accordingly, the non-heat adhesive layer 51 includes one or more of common adhesive materials that exhibit adhesion at an ambient temperature and an ambient pressure. Although not particularly limited in kind, the adhesive material is a rubber-based adhesive, and the rubber-based adhesive is a polymer compound having a property of being adhesive at an ambient temperature and an ambient pressure. Specific examples of the polymer compound include a natural rubber, a polyisoprene rubber, a styrene-butadiene rubber, a styrene-isoprene rubber, a styrene-isoprene-styrene block copolymer rubber, a styrene-butadiene-styrene block copolymer rubber, a styrene-ethylene-butylene-styrene block copolymer rubber, a styrene-ethylene-propylene-styrene block copolymer rubber, a styrene-ethylene-propylene block copolymer rubber, a regenerated rubber, a butyl rubber, polyisobutylene, and modified products thereof.

A thickness of the non-heat adhesive layer 51 is not particularly limited, and may thus be set as desired. For example, the thickness of the non-heat adhesive layer 51 is greater than or equal to 3 μm. A reason for this is that adhesion of the adhesive tape 50 to the outer package film 10 becomes sufficiently high.

As described above, the heat adhesive layer 52 is a layer that exhibits adhesion as a result of application of heat and pressure, and includes oriented polystyrene. Oriented polystyrene is polystyrene that has been subjected to a stretching treatment (an orientation treatment) in a predetermined direction (one direction or two or more directions). The adhesive tape 50 in which the heat adhesive layer 52 includes oriented polystyrene is an oriented polystyrene tape (a so-called OPS (registered trademark) tape).

A thickness of the heat adhesive layer 52 is not particularly limited, and may thus be set as desired. For example, the thickness of the heat adhesive layer 52 is greater than or equal to 5 μm. A reason for this is that adhesion of the adhesive tape 50 to the battery device 20 (the positive electrode current collector 21A) becomes sufficiently high.

A reason why the non-heat adhesive layer 51 is adhered to the outer package film 10 and the heat adhesive layer 52 is adhered to the battery device 20 (the positive electrode current collector 21A) is that the adhesive tape 50 is more firmly and stably adhered to each of the outer package film 10 and the battery device 20 than in a case where the non-heat adhesive layer 51 is adhered to the battery device 20 and the heat adhesive layer 52 is adhered to the outer package film 10. The reason described here will be described in more detail later.

The number of the adhesive tapes 50 to be provided is not particularly limited, and may thus be one, or two or more. FIGS. 5 and 6 each illustrate a case where the number of the adhesive tapes 50 provided is one.

The location on the battery device 20 where the adhesive tape 50 is to be provided is not particularly limited, and may thus be set as desired.

In particular, the adhesive tape 50 is preferably adhered to the flat surface M1 of the battery device 20. A reason for this is that it becomes easier for the adhesive tape 50 to be adhered to the battery device 20 by making use of the flatness of the flat surface M1, as compared with a case where the adhesive tape 50 is adhered to the curved surface M2.

Further, the adhesive tape 50 is preferably provided in a region R between the positive electrode lead 31 and the negative electrode lead 32, in other words, the adhesive tape 50 is preferably provided in such a manner as not to overlap with each of the positive electrode lead 31 and the negative electrode lead 32. A reason for this is that such a configuration allows for a decrease in the outer diameter of the secondary battery and thus allows for an increase in energy density per unit volume of the secondary battery, as compared with a case where the adhesive tape 50 is provided in such a manner as to overlap with the positive electrode lead 31, the negative electrode lead 32, or both.

Thus, the area of provision of the adhesive tape 50 is preferably as large as possible within the region R. A reason for this is that the adhesion of the adhesive tape 50 to each of the outer package film 10 and the battery device 20 improves.

Upon charging the secondary battery, in the battery device 20, lithium is extracted from the positive electrode 21, and the extracted lithium is inserted into the negative electrode 22 via the electrolytic solution. In contrast, upon discharging the secondary battery, in the battery device 20, lithium is extracted from the negative electrode 22, and the extracted lithium is inserted into the positive electrode 21 via the electrolytic solution. Upon the charging and the discharging, lithium is inserted and extracted in an ionic state.

Here, used is the outer package film 10 that has one open end and thus has an opening (not illustrated) at the one end. In the following, where appropriate, reference will be made to FIGS. 1 to 6 which have already been described.

The positive electrode active material is mixed with other materials including, without limitation, the positive electrode binder and the positive electrode conductor to thereby obtain a positive electrode mixture. Thereafter, the positive electrode mixture is put into a solvent such as an organic solvent to thereby prepare a paste positive electrode mixture slurry. Thereafter, the positive electrode mixture slurry is applied on the two opposed surfaces of the positive electrode current collector 21A to thereby form the positive electrode active material layers 21B. After forming the positive electrode active material layers 21B, the positive electrode active material layers 21B may be compression-molded by means of, for example, a roll pressing machine. In this case, the positive electrode active material layers 21B may be heated. The positive electrode active material layers 21B may be compression-molded multiple times. The positive electrode 21 is thus fabricated.

In a case of fabricating the positive electrode 21, a range of formation of the positive electrode active material layer 21B is adjusted in such a manner that the surface F1 on the outer side of the winding of the positive electrode current collector 21A is exposed in the positive electrode 21 of the outermost wind when the battery device 20 is fabricated in a later process.

The negative electrode active material layers 22B are formed on the respective two opposed surfaces of the negative electrode current collector 22A by a procedure similar to the fabrication procedure of the positive electrode 21 described above. Specifically, the negative electrode active material is mixed with other materials including, without limitation, the negative electrode binder and the negative electrode conductor to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on the two opposed surfaces of the negative electrode current collector 22A to thereby form the negative electrode active material layers 22B. Thereafter, the negative electrode active material layers 22B may be compression-molded. The negative electrode 22 is thus fabricated.

The electrolyte salt is put into the solvent. The electrolyte salt is thereby dispersed or dissolved in the solvent. As a result, the electrolytic solution is prepared.

First, the positive electrode lead 31 is coupled to the positive electrode 21 (the positive electrode current collector 21A) by a method such as a welding method, and the negative electrode lead 32 is coupled to the negative electrode 22 (the negative electrode current collector 22A) by a method such as a welding method.

Thereafter, the positive electrode 21 and the negative electrode 22 are stacked on each other with the separator 23 interposed therebetween, following which the stack of the positive electrode 21, the negative electrode 22, and the separator 23 is wound about the winding axis P to thereby fabricate a wound body. The wound body has a configuration similar to that of the battery device 20 except that the positive electrode 21, the negative electrode 22, and the separator 23 are each not impregnated with the electrolytic solution. In this case, respective winding positions of the positive electrode 21 and the negative electrode 22 are adjusted in such a manner that the positive electrode 21 is disposed in the outermost wind. Thereafter, the wound body is pressed by means of, for example, a pressing machine to thereby shape the wound body into an elongated shape.

Thereafter, the adhesive tape 50 is attached to the outer package film 10. In this case, the adhesive tape 50 is adhered to an inner surface of the outer package film 10 via the non-heat adhesive layer 51. Thereafter, the wound body is placed inside the outer package film 10 through the opening, following which the electrolytic solution is injected into the outer package film 10 through the opening. Thereafter, portions of the outer package film 10 (the fusion-bonding layer) opposed to each other at the opening are thermal-fusion-bonded to each other by a thermal-fusion-bonding method. In this case, the positive electrode lead 31 and the negative electrode lead 32 are each led out from the inside to the outside of the outer package film 10. Further, the sealing film 41 is interposed between the outer package film 10 and the positive electrode lead 31, and the sealing film 42 is interposed between the outer package film 10 and the negative electrode lead 32. The wound body is thereby impregnated with the electrolytic solution, and the battery device 20 which is the wound electrode body is thus fabricated. The outer package film 10 is thereby sealed, and the battery device 20 is thus sealed inside the outer package film 10. As a result, the secondary battery is assembled.

Lastly, with use of, for example, a heat pressing machine, pressure is applied in the Z direction to the secondary battery (at the location where the adhesive tape 50 is provided) under heating. Various conditions including, for example, a temperature at the time of the heating and a pressure at the time of the pressure application are set as desired. The heat adhesive layer 52 is thereby heated in a state of being closely attached to the battery device 20 (the surface F1 on the outer side of the winding of the positive electrode current collector 21A), and the adhesive tape 50 is thus adhered to the battery device 20 via the heat adhesive layer 52. As a result, the outer package film 10 and the battery device 20 are adhered to each other via the adhesive tape 50. The battery device 20 is thus fixed to the outer package film 10 via the adhesive tape 50.

The assembled secondary battery is charged and discharged. Various conditions including, for example, an environment temperature, the number of times of charging and discharging (the number of cycles), and charging and discharging conditions, may be set as desired. This process forms a film on a surface of, for example, the negative electrode 22. This brings the secondary battery into an electrochemically stable state.

The secondary battery including the outer package film 10, that is, the secondary battery of the laminated-film type, is thus completed.

According to the secondary battery, the battery device 20 including the positive electrode 21 and the negative electrode 22 that are opposed to each other and are wound is contained inside the outer package film 10 having flexibility, and the adhesive tape 50 is adhered to each of the outer package film 10 and the battery device 20. The positive electrode 21 and the negative electrode 22 are wound in such a manner that the positive electrode 21 is disposed in the outermost wind. The adhesive tape 50 includes the non-heat adhesive layer 51 adhered to the outer package film 10, and the heat adhesive layer 52 (oriented polystyrene) adhered to the battery device 20. Accordingly, it is possible to achieve superior physical durability for reasons described below.

Figure 7:
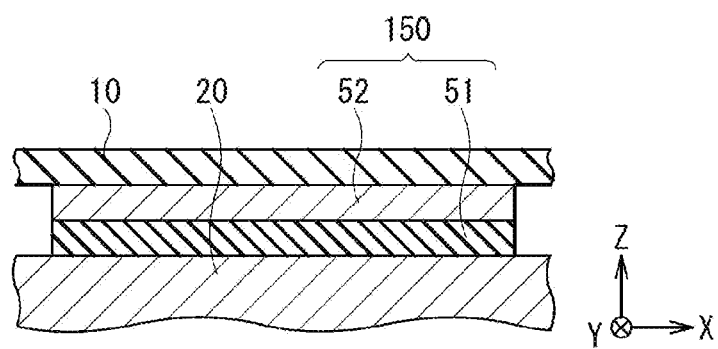
FIG. 7 is an enlarged sectional view of a configuration of a main part of a secondary battery according to a first comparative example.
Figure 8:
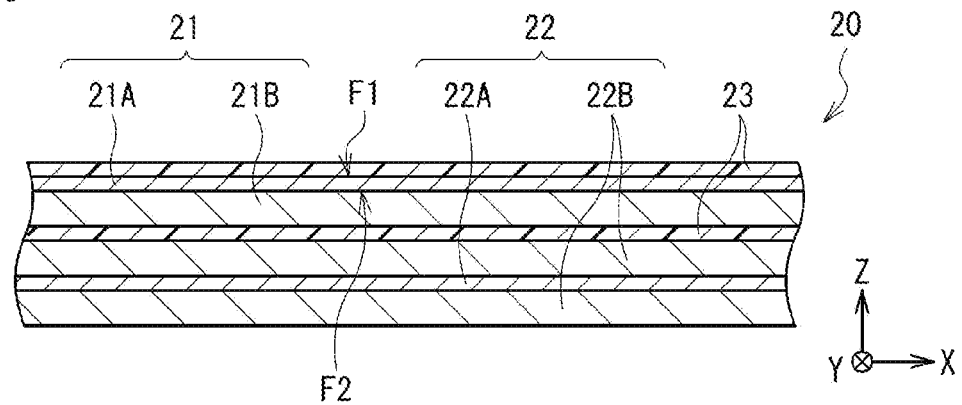
FIG. 8 is an enlarged sectional view of a configuration of a secondary battery (a battery device) according to a second comparative example.

FIG. 7 illustrates an enlarged sectional configuration of a main part of a secondary battery according to a first comparative example, and corresponds to FIG. 6. FIG. 8 illustrates an enlarged sectional configuration of a secondary battery (the battery device 20) according to a second comparative example, and corresponds to FIG. 4.

The secondary battery according to the first comparative example has a configuration similar to the configuration of the secondary battery according to an embodiment except for including an adhesive tape 150 instead of the adhesive tape 50. The order in which the non-heat adhesive layer 51 and the heat adhesive layer 52 are stacked in the adhesive tape 150 is opposite to the order in which the non-heat adhesive layer 51 and the heat adhesive layer 52 are stacked in the adhesive tape 50. In other words, the adhesive tape 150 includes the non-heat adhesive layer 51 adhered to the battery device 20 (the surface F1 on the outer side of the winding of the positive electrode current collector 21A), and the heat adhesive layer 52 adhered to the outer package film 10.

The secondary battery (the battery device 20) according to the second comparative example has a configuration similar to the configuration of the secondary battery (the battery device 20) according to an embodiment except that the separator 23, instead of the positive electrode 21, is disposed in the outermost wind. In other words, in the battery device 20, the positive electrode 21, the negative electrode 22, and the separator 23 are wound in such a manner that the separator 23 is disposed in the outermost wind.

In the secondary battery according to the first comparative example, as illustrated in FIG. 7, the adhesive tape 150 is adhered to each of the outer package film 10 and the battery device 20 (the positive electrode 21).

However, the non-heat adhesive layer 51 including a common adhesive material such as the rubber-based adhesive has a property of easily adhering to the outer package film 10 (the fusion-bonding layer) including a polymer compound such as polypropylene, and also easily adhering to the positive electrode current collector 21A including the metal material such as aluminum. In contrast, the heat adhesive layer 52 including oriented polystyrene has a property of easily adhering to the positive electrode current collector 21A including the metal material such as aluminum, but not easily adhering to the outer package film 10 (the fusion-bonding layer) including the polymer compound such as polypropylene.

Accordingly, in the secondary battery according to the first comparative example in which the adhesive tape 150 is adhered to the battery device 20 (the positive electrode current collector 21A) via the non-heat adhesive layer 51 and is adhered to the outer package film 10 (the fusion-bonding layer) via the heat adhesive layer 52, the adhesive tape 150 sufficiently adheres to the battery device 20, but does not sufficiently adhere to the outer package film 10.

In this case, the battery device 20 is not sufficiently fixed to the outer package film 10 via the adhesive tape 150. Accordingly, when the secondary battery undergoes a shock upon being dropped, for example, the adhesive tape 150 easily peels off from the outer package film 10, and the battery device 20 thereby easily falls off from the outer package film 10. As a result, it becomes easier for the battery device 20 inside the outer package film 10 to move upon the shock. The battery device 20 is thus damaged easily. Accordingly, it is difficult to improve physical durability of the secondary battery.

In the secondary battery according to the second comparative example, as illustrated in FIG. 8, the adhesive tape 50 is adhered to each of the outer package film 10 and the battery device 20 (the separator 23).

However, the non-heat adhesive layer 51 including the common adhesive material such as the rubber-based adhesive has a property of easily adhering to the outer package film 10 (the fusion-bonding layer) including the polymer compound such as polypropylene, whereas the heat adhesive layer 52 including oriented polystyrene has a property of not easily adhering to the separator 23 including a polymer compound such as polyethylene.

Accordingly, in the secondary battery according to the second comparative example in which the adhesive tape 50 is adhered to the outer package film 10 (the fusion-bonding layer) via the non-heat adhesive layer 51 and is adhered to the battery device 20 (the separator 23) via the heat adhesive layer 52, the adhesive tape 50 sufficiently adheres to the outer package film 10, but does not sufficiently adhere to the battery device 20.

In this case, the battery device 20 is not sufficiently fixed to the battery device 20 via the adhesive tape 50. Accordingly, when the secondary battery undergoes a shock, the battery device 20 easily peels off from the adhesive tape 50, and the battery device 20 thereby easily falls off from the outer package film 10. As a result, it becomes easier for the battery device 20 to move upon the shock. The battery device 20 is thus damaged easily. Accordingly, it is difficult to improve the physical durability of the secondary battery.

In contrast, in the secondary battery according to an embodiment, as illustrated in FIG. 6, the adhesive tape 50 is adhered to each of the outer package film 10 and the battery device 20 (the positive electrode 21).

In this case, the non-heat adhesive layer 51 including the common adhesive material such as the rubber-based adhesive easily adheres to the outer package film 10 (the fusion-bonding layer) including the polymer compound such as polypropylene, and the heat adhesive layer 52 including oriented polystyrene easily adheres to the battery device 20 (the surface F1 on the outer side of the winding of the positive electrode current collector 21A) including the metal material such as aluminum.

Accordingly, in the secondary battery according to an embodiment in which the adhesive tape 50 is adhered to the outer package film 10 (the fusion-bonding layer) via the non-heat adhesive layer 51 and is adhered to the battery device 20 (the positive electrode current collector 21A) via the heat adhesive layer 52, the adhesive tape 50 sufficiently adheres to the outer package film 10 and also sufficiently adheres to the battery device 20.

In this case, the battery device 20 is sufficiently fixed to the outer package film 10 and to the battery device 20 via the adhesive tape 50. This prevents the adhesive tape 50 from peeling off from the outer package film 10 easily and thereby prevents the battery device 20 from falling off from the outer package film 10 easily, even if the secondary battery undergoes a shock. As a result, the battery device 20 is prevented from moving easily upon the shock, and is thus prevented from being damaged easily. Accordingly, it becomes possible to improve the physical durability of the secondary battery.

Moreover, no positive electrode active material layer 21B is provided on the surface F1 on the outer side of the winding of the positive electrode current collector 21A in the positive electrode 21 of the outermost wind. This allows the outer diameter of the battery device 20 to be decreased as compared with a case where the positive electrode active material layer 21B is provided on the surface F1 on the outer side of the winding of the positive electrode current collector 21A in the positive electrode 21 of the outermost wind. This makes it possible to improve the physical durability of the secondary battery while increasing the energy density per unit volume of the secondary battery.

In particular, in the secondary battery according to an embodiment, the adhesive tape 50 may include an oriented polystyrene tape. This allows the outer package film 10 and the battery device 20 to be easily and stably adhered to each other via the adhesive tape 50. Accordingly, it is possible to achieve higher effects.

Further, the non-heat adhesive layer 51 may include the rubber-based adhesive. This allows the adhesive tape 50 to be easily and sufficiently adhered to the outer package film 10 via the non-heat adhesive layer 51. Accordingly, it is possible to achieve higher effects.

Further, the adhesive tape 50 may be adhered to the flat surface M1 of the battery device 20. This allows the adhesive tape 50 to be easily adhered to the battery device 20 by making use of the flatness of the flat surface M1. Accordingly, it is possible to achieve higher effects.

Further, in the positive electrode 21 of the outermost wind, the positive electrode active material layer 21B may be provided on the surface F2 on the inner side of the winding of the positive electrode current collector 21A. This prevents the winding displacement of the positive electrode 21 of the outermost wind from occurring easily. The secondary battery is thus prevented from being damaged easily. Accordingly, it is possible to achieve higher effects.

Further, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery is appropriately modifiable as described below according to an embodiment. Note that any two or more of the following series of modifications may be combined with each other.

Figure 9:
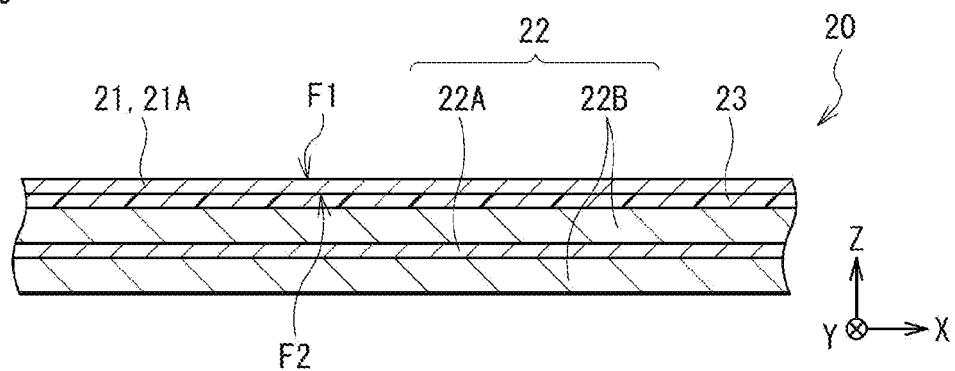
FIG. 9 is a sectional view of a configuration of a secondary battery (a battery device) according to an embodiment.

In FIG. 4, the positive electrode 21 is disposed in the outermost wind of the battery device 20. In the positive electrode 21 in the outermost wind, the positive electrode active material layer 21B is provided on the surface F2 on the inner side of the winding of the positive electrode current collector 21A. However, as illustrated in FIG. 9 corresponding to FIG. 4, no positive electrode active material layer 21B may be provided on the surface F2 on the inner side of the winding of the positive electrode current collector 21A in the positive electrode 21 of the outermost wind. In this case also, the adhesive tape 50 is sufficiently adhered to the battery device 20 (the surface F1 on the outer side of the winding of the positive electrode current collector 21A) via the heat adhesive layer 52, and it is thus possible to improve the physical durability of the secondary battery.

However, in order to prevent the winding displacement of the positive electrode 21 of the outermost wind from occurring, the positive electrode active material layer 21B is preferably provided on the surface F2 on the inner side of the winding of the positive electrode current collector 21A.

In more detail, in the case where no positive electrode active material layer 21B is provided on the surface F2 on the inner side of the winding of the positive electrode current collector 21A in the positive electrode 21 of the outermost wind, the positive electrode current collector 21A is in direct contact with the separator 23 as illustrated in FIG. 9, which can make it difficult for the positive electrode 21 (the positive electrode current collector 21A) to be sufficiently closely attached to the separator 23. As a result, if the winding displacement of the positive electrode 21 occurs when the secondary battery undergoes a shock, it becomes easier for the battery device 20 to move, which can lead to damage to the battery device 20.

In contrast, in the case where the positive electrode active material layer 21B is provided on the surface F2 on the inner side of the winding of the positive electrode current collector 21A in the positive electrode 21 of the outermost wind, the positive electrode current collector 21A is in indirect contact with the separator 23, with the positive electrode active material layer 21B interposed therebetween, as illustrated in FIG. 4. Accordingly, the positive electrode 21 (the positive electrode current collector 21A) is sufficiently closely attached to the separator 23. As a result, the winding displacement of the positive electrode 21 is prevented from occurring easily even if the secondary battery undergoes a shock. This prevents the battery device 20 from moving easily, and thus prevents the battery device 20 from being damaged easily.

In FIG. 4, the positive electrode 21 and the negative electrode 22 are wound in such a manner that the positive electrode 21 is disposed in the outermost wind. In the positive electrode 21 of the outermost wind, no positive electrode active material layer 21B is provided on the surface F1 on the outer side of the winding of the positive electrode current collector 21A, and the surface F1 on the outer side of the winding of the positive electrode current collector 21A is exposed.

Figure 10:
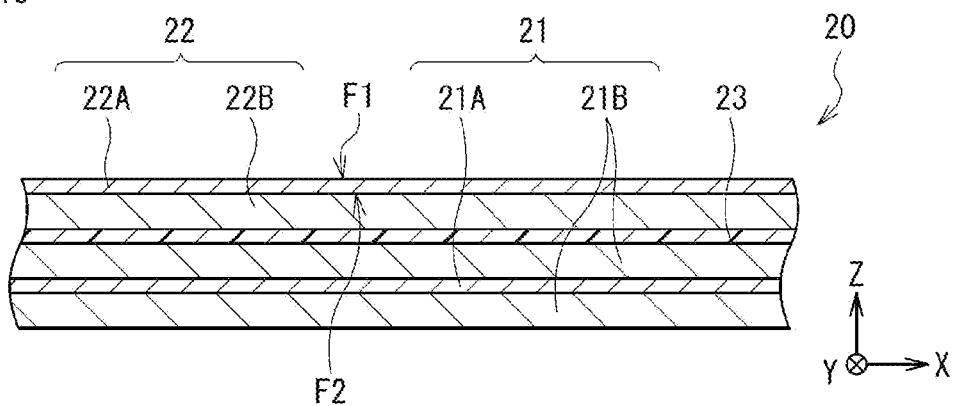
FIG. 10 is a sectional view of a configuration of a secondary battery (a battery device) according to an embodiment.

However, as illustrated FIG. 10 corresponding to FIG. 4, the positive electrode 21 and the negative electrode 22 may be wound in such a manner that the negative electrode 22 is disposed in the outermost wind. In such a negative electrode 22 of the outermost wind, no negative electrode active material layer 22B may be provided on the surface F1 on the outer side of the winding of the negative electrode current collector 22A, and the surface F1 on the outer side of the winding may thus be exposed. In other words, in the battery device 20 which is the wound electrode body, neither the positive electrode 21 nor the separator 23 may be disposed in the outermost wind, and the negative electrode 22 may be disposed in the outermost wind. In the negative electrode 22 of the outermost wind, the negative electrode active material layer 22B is provided on the surface F2 on the inner side of the winding of the negative electrode current collector 22A.

In this case also, the adhesive tape 50 is sufficiently adhered to the battery device 20 (the negative electrode current collector 22A) via the heat adhesive layer 52 by making use of the property of the heat adhesive layer 52 of easily adhering to the battery device 20 (the surface F1 on the outer side of the winding of the negative electrode current collector 22A) including the metal material such as copper. This makes it easier for the battery device 20 to be fixed to the outer package film 10 via the adhesive tape 50, similarly to the case where the positive electrode 21 and the negative electrode 22 are wound in such a manner that the positive electrode 21 is disposed in the outermost wind. Accordingly, it is possible to improve the physical durability of the secondary battery.

Figure 11:
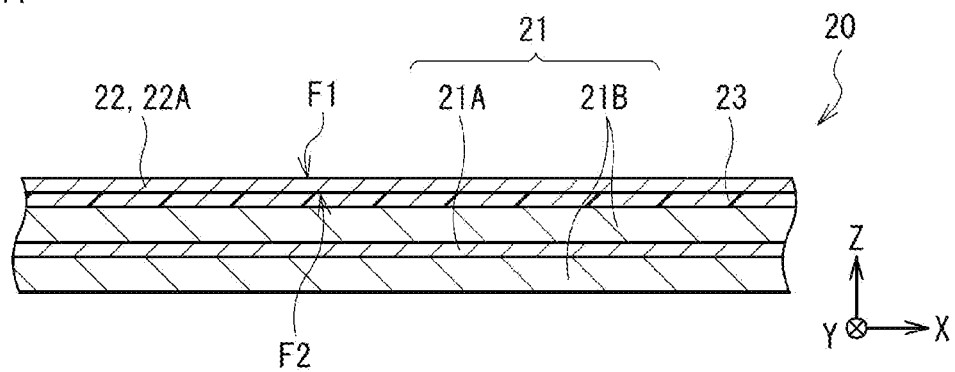
FIG. 11 is a sectional view of a configuration of a secondary battery (a battery device) according to an embodiment.

Needless to say, in the case where the negative electrode 22 is disposed in the outermost wind, no negative electrode active material layer 22B may be provided on the surface F2 on the inner side of the winding of the negative electrode current collector 22A in the negative electrode 22 of the outermost wind, as illustrated in FIG. 11 corresponding to FIG. 10. In this case also, the adhesive tape 50 is sufficiently adhered to the battery device 20 (the negative electrode current collector 22A) via the heat adhesive layer 52, and it is thus possible to improve the physical durability of the secondary battery.

However, in order to prevent winding displacement of the negative electrode 22 of the outermost wind from occurring, the negative electrode active material layer 22B is preferably provided on the surface F2 on the inner side of the winding of the negative electrode current collector 22A for a reason similar to the reason for the case described in Modification 1 regarding the positive electrode 21.

In FIG. 5, the adhesive tape 50 is disposed between the outer package film 10 and the battery device 20 where the secondary battery is viewed from one side (a top side in FIG. 5, that is, a front side of the secondary battery) in the thickness direction (the Z-axis direction). The secondary battery thus includes one adhesive tape 50.

However, although not specifically illustrated here, the adhesive tape 50 may be disposed between the outer package film 10 and the battery device 20 where the secondary battery is viewed from the other side (a bottom side in FIG. 5, that is, a back side of the secondary battery) in the thickness direction (the Z-axis direction). The secondary battery may thus include one adhesive tape 50. In this case also, the battery device 20 is fixed to the outer package film 10 via the adhesive tape 50, and it is thus possible to improve the physical durability of the secondary battery.

Needless to say, the secondary battery may include the adhesive tape 50 disposed between the outer package film 10 and the battery device 20 on the front side, and the adhesive tape 50 disposed between the outer package film 10 and the battery device 20 on the back side, and may thus include two adhesive tapes 50 in total. In this case, the battery device 20 is more firmly fixed to the outer package film 10 via the two adhesive tapes 50, and it is thus possible to further improve the physical durability of the secondary battery.

The separator 23 having a single-layer structure configured by a porous film is used. However, although not specifically illustrated here, the separator 23 having a multilayer structure (i.e., the separator 23 of a stacked type) including a polymer compound layer may be used instead of the single-layer separator 23.

Specifically, the separator 23 of the stacked type includes a porous layer (a porous film) having two opposed surfaces, and a polymer compound layer disposed on one of or each of the two opposed surfaces of the porous layer. A reason for this is that adherence of the separator 23 to each of the positive electrode 21 and the negative electrode 22 improves to suppress the occurrence of winding displacement of the battery device 20. This helps to prevent the secondary battery from easily swelling even if, for example, a decomposition reaction of the electrolytic solution occurs. The polymer compound layer includes a polymer compound such as polyvinylidene difluoride which has superior physical strength and is electrochemically stable.

Note that the porous layer, the polymer compound layer, or both may each include one or more kinds of insulating particles. A reason for this is that the insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator 23 of the stacked type, a polymer compound solution including, without limitation, the polymer compound and an organic solvent is prepared, following which the polymer compound solution is applied on one of or each of the two opposed surfaces of the porous layer. In another example, the porous layer may be immersed in the polymer compound solution. In this case, the insulating particles may be added to the polymer compound solution on an as-needed basis.

In the case where the separator 23 of the stacked type is used also, lithium ions are movable between the positive electrode 21 and the negative electrode 22, and similar effects are therefore obtainable.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are wound with the separator 23 and the electrolyte layer interposed therebetween. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that leakage of the electrolytic solution is prevented. The configuration of the electrolytic solution is as described above. The polymer compound includes, for example, polyvinylidene difluoride. In a case of forming the electrolyte layer, an electrolyte solution including, for example, the electrolytic solution, the polymer compound, and an organic solvent is prepared, following which the electrolyte solution is applied on one side or both sides of the positive electrode 21 and on one side or both sides of the negative electrode 22.

In a case where the electrolyte layer is used also, lithium ions are movable between the positive electrode 21 and the negative electrode 22 via the electrolyte layer, and similar effects are therefore obtainable.

Next, a description is given of applications (application examples) of the secondary battery according to an embodiment.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. The above-described applications may each use one secondary battery, or may each use multiple secondary batteries.

In particular, the battery packs are each effectively applied to relatively large-sized equipment, etc., including an electric vehicle, an electric power storage system, and an electric power tool. The battery packs may each include a single battery, or may each include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some application examples of the secondary battery will now be described in detail. The configurations of the application examples described below are merely examples, and are appropriately modifiable.

Figure 12:
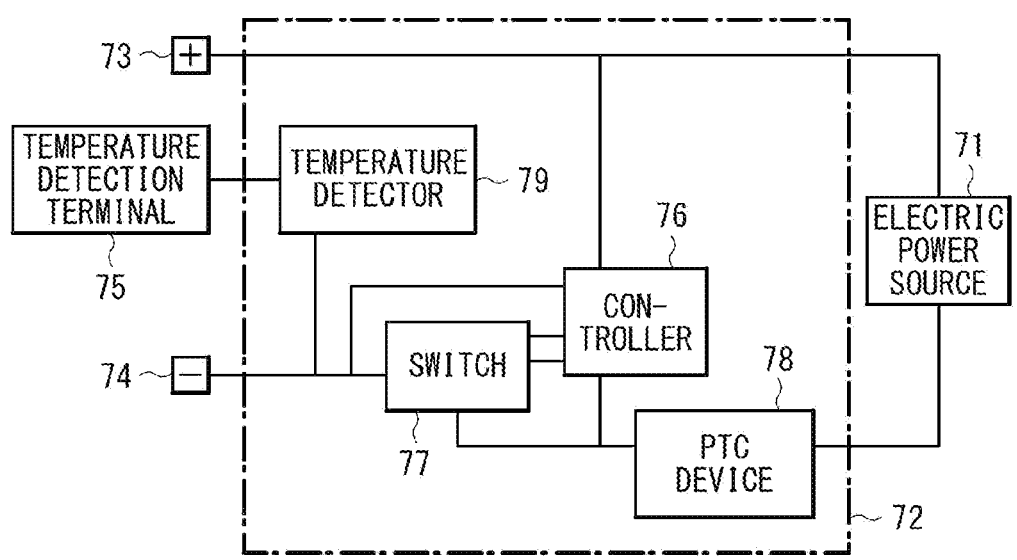
FIG. 12 is a block diagram illustrating a configuration of an application example of the secondary battery.

FIG. 12 illustrates a block configuration of a battery pack. The battery pack described here is a simple battery pack (a so-called soft pack) including one secondary battery, and is to be mounted on, for example, electronic equipment typified by a smartphone.

As illustrated in FIG. 12, the battery pack includes an electric power source 71 and a circuit board 72. The circuit board 72 is coupled to the electric power source 71, and includes a positive electrode terminal 73, a negative electrode terminal 74, and a temperature detection terminal 75. The temperature detection terminal 75 is a so-called T terminal.

The electric power source 71 includes one secondary battery. The secondary battery has a positive electrode lead coupled to the positive electrode terminal 73 and a negative electrode lead coupled to the negative electrode terminal 74. The electric power source 71 is couplable to outside via the positive electrode terminal 73 and the negative electrode terminal 74, and is thus chargeable and dischargeable. The circuit board 72 includes a controller 76, a switch 77, a thermosensitive resistive device (a positive temperature coefficient (PTC) device) 78, and a temperature detector 79. However, the PTC device 78 may be omitted.

The controller 76 includes, for example, a central processing unit (CPU) and a memory, and controls an overall operation of the battery pack. The controller 76 detects and controls a use state of the electric power source 71 on an as-needed basis.

If a voltage of the electric power source 71 (the secondary battery) reaches an overcharge detection voltage or an overdischarge detection voltage, the controller 76 turns off the switch 77. This prevents a charging current from flowing into a current path of the electric power source 71. In addition, if a large current flows upon charging or discharging, the controller 76 turns off the switch 77 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 77 includes, for example, a charge control switch, a discharge control switch, a charging diode, and a discharging diode. The switch 77 performs switching between coupling and decoupling between the electric power source 71 and external equipment in accordance with an instruction from the controller 76. The switch 77 includes, for example, a metal-oxide-semiconductor field-effect transistor (MOSFET). The charging and discharging currents are detected on the basis of an ON-resistance of the switch 77.

The temperature detector 79 includes a temperature detection device such as a thermistor. The temperature detector 79 measures a temperature of the electric power source 71 using the temperature detection terminal 75, and outputs a result of the temperature measurement to the controller 76. The result of the temperature measurement to be obtained by the temperature detector 79 is used, for example, in a case where the controller 76 performs charge/discharge control upon abnormal heat generation or in a case where the controller 76 performs a correction process upon calculating a remaining capacity.

EXAMPLES

A description is given of Examples of the present technology below according to an embodiment.

Experiment Examples 1 to 4 and Comparative Examples 1 to 6

Secondary batteries were fabricated, following which the secondary batteries were each evaluated for their performance.

[Fabrication of Secondary Battery]

The secondary batteries of the laminated-film type (the lithium-ion secondary batteries) illustrated in, for example, FIGS. 1 to 6 were each fabricated by the following procedure.

(Fabrication of Positive Electrode)

First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on the two opposed surfaces of the positive electrode current collector 21A (a strip-shaped aluminum foil having a thickness of 12 μm) by means of a coating apparatus, following which the applied positive electrode mixture slurry was dried to thereby form the positive electrode active material layers 21B. Lastly, the positive electrode active material layers 21B were compression-molded by means of a roll pressing machine. The positive electrode 21 was thus fabricated.

In a case of fabricating the positive electrode 21, the range of formation of the positive electrode active material layer 21B was adjusted in accordance with whether the positive electrode 21 was to be disposed in the outermost wind when the battery device 20 (the wound body) was fabricated in a later process. Specifically, in a case where the positive electrode 21 was to be disposed in the outermost wind, the positive electrode active material layer 21B was not formed on the surface F1 on the outer side of the winding and was formed only on the surface F2 on the inner side of the winding, of the positive electrode current collector 21A in the positive electrode 21 of the outermost wind. In addition, in a case where the positive electrode 21 was not to be disposed in the outermost wind, the positive electrode active material layer 21B was formed on each of the surface F1 on the outer side of the winding and the surface F2 on the inner side of the winding, of the positive electrode current collector 21A in the positive electrode 21 of the outermost wind.

The column of "outermost wind" in Table 1 indicates a component (the positive electrode 21, the negative electrode 22, or the separator 23) to be disposed in the outermost wind of the battery device 20. The column of "active material layer (outer side of winding)" indicates whether the active material layer was provided on the outer side of the winding (the surface F1 on the outer side of the winding) of the electrode (the positive electrode 21 or the negative electrode 22) disposed in the outermost wind, and the column of "active material layer (inner side of winding)" indicates whether the active material layer was provided on the inner side of the winding (the surface F2 on the inner side of the winding) of the electrode (the positive electrode 21 or the negative electrode 22) disposed in the outermost wind. The "active material layer" represents the positive electrode active material layer 21B in a case where the electrode disposed in the outermost wind was the positive electrode 21, and represents the negative electrode active material layer 22B in a case where the electrode disposed in the outermost wind was the negative electrode 22.

(Fabrication of Negative Electrode)

First, 93 parts by mass of the negative electrode active material (artificial graphite) and 7 parts by mass of the negative electrode binder (polyvinylidene difluoride) were mixed with each other, to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the negative electrode mixture slurry was applied on the two opposed surfaces of the negative electrode current collector 22A (a strip-shaped copper foil having a thickness of 15 μm) by means of a coating apparatus, following which the applied negative electrode mixture slurry was dried to thereby form the negative electrode active material layers 22B. Lastly, the negative electrode active material layers 22B were compression-molded by means of the roll pressing machine. In this manner, the negative electrode active material layers 22B were formed on the respective two opposed surfaces of the negative electrode current collector 22A. Thus, the negative electrode 22 was fabricated.

In a case of fabricating the negative electrode 22, the range of formation of the negative electrode active material layer 22B was adjusted in accordance with whether the negative electrode 22 was to be disposed in the outermost wind when the battery device 20 (the wound body) was fabricated in a later process. Specifically, in a case where the negative electrode 22 was to be disposed in the outermost wind, the negative electrode active material layer 22B was not formed on the surface F1 on the outer side of the winding and was formed only on the surface F2 on the inner side of the winding, of the negative electrode current collector 22A in the negative electrode 22 of the outermost wind. In addition, in a case where the negative electrode 22 was not to be disposed in the outermost wind, the negative electrode active material layer 22B was formed on each of the surface F1 on the outer side of the winding and the surface F2 on the inner side of the winding, of the negative electrode current collector 22A in the negative electrode 22 of the outermost wind.

(Fabrication of Separator)

The polymer compound (polyvinylidene difluoride) was put into an organic solvent (N-methyl-2-pyrrolidone), following which the organic solvent was stirred to thereby prepare a polymer compound solution. Thereafter, the polymer compound solution was applied on each of the two opposed surfaces of the porous layer (which is a fine-porous polyethylene film having a thickness of 15 µm), following which the polymer compound solution was dried to thereby form the polymer compound layer. The separator 23 of the stacked type was thus fabricated.

(Preparation of Electrolytic Solution)

The electrolyte salt ($LiPF_6$) was added to the solvent (ethylene carbonate and diethyl carbonate), following which the solvent was stirred. In this case, a mixture ratio (a weight ratio) between ethylene carbonate and diethyl carbonate in the solvent was set to 30:70, and a content of the electrolyte salt was set to 1 mol/kg with respect to the solvent. The electrolyte salt was thereby dissolved or dispersed in the solvent. As a result, the electrolytic solution was prepared.

(Assembly of Secondary Battery)

First, by a resistance welding method, the positive electrode lead 31 including aluminum was welded to the positive electrode 21 (the positive electrode current collector 21A) and the negative electrode lead 32 including nickel was welded to the negative electrode 22 (the negative electrode current collector 22A).

Thereafter, the positive electrode 21 and the negative electrode 22 were stacked on each other with the separator 23 of the stacked type interposed therebetween, following which the stack of the positive electrode 21, the negative electrode 22, and the separator 23 was wound about the winding axis P to thereby fabricate the wound body. In this case, as indicated in Table 1, the positive electrode 21, the negative electrode 22, and the separator 23 were wound in such a manner that the positive electrode 21 or the negative electrode 22 was disposed in the outermost wind. Thereafter, the wound body was pressed by means of a pressing machine, and was thereby shaped into an elongated shape.

Thereafter, the adhesive tape 50 (including the non-heat adhesive layer 51 and the heat adhesive layer 52) was attached to an inner surface of the outer package film 10 having an opening. As the outer package film 10, an aluminum laminated film was used in which a fusion-bonding layer (a polypropylene film having a thickness of 30 µm), a metal layer (an aluminum foil having a thickness of 40 µm), and a surface protective layer (a nylon film having a thickness of 25 µm) were stacked in this order from an inner side. The adhesive tape 50 had a configuration as presented in Table 1. As the configuration of the adhesive tape 50, Table 1 lists respective materials (kinds) of the non-heat adhesive layer 51 and the heat adhesive layer 52, and respective objects to which the non-heat adhesive layer 51 and the heat adhesive layer 52 were to be adhered. The adhesive tape 50 (the oriented polystyrene tape) in which the heat adhesive layer 52 includes oriented polystyrene is a so-called OPS (registered trademark) tape, as described above. In this case, the adhesive tape 50 was adhered to the outer package film 10 via the non-heat adhesive layer 51.

Thereafter, the wound body was placed into the outer package film 10 through the opening, following which the electrolytic solution was injected into the outer package film 10 through the opening.

Thereafter, portions of the outer package film 10 (the fusion-bonding layer) opposed to each other at the opening were thermal-fusion-bonded to each other in such a manner that each of the positive electrode lead 31 and the negative electrode lead 32 was led out from the outer package film 10 to the outside. In this case, the sealing film 41 (a polypropylene film having a thickness of 5 µm) was interposed between the outer package film 10 and the positive electrode lead 31, and the sealing film 42 (a polypropylene film having a thickness of 5 µm) was interposed between the outer package film 10 and the negative electrode lead 32. The wound body was thereby impregnated with the electrolytic solution, and the battery device 20 as the wound electrode body was thus fabricated. The outer package film 10 was sealed, and the battery device 20 was thus sealed inside the outer package film 10. As a result, the secondary battery including the outer package film 10 and the battery device 20 was assembled.

Lastly, with use of a heat pressing machine, pressure was applied to the secondary battery under heating at the location where the adhesive tape 50 was provided. The temperature at the time of the heating was 70° C., and the pressure at the time of the pressure application was 10 $kg/cm^2$. The adhesive tape 50 was thus adhered to the battery device 20 via the heat adhesive layer 52. In this manner, the outer package film 10 and the battery device 20 were adhered to each other via the adhesive tape 50. As a result, the battery device 20 was fixed to the outer package film 10 via the adhesive tape 50.

(Stabilization of Secondary Battery)

The assembled secondary battery was charged and discharged for one cycle in an ambient temperature environment (at a temperature of 23° C.). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 3.0 V. Note that 0.1 C is a value of a current that causes a battery capacity (a theoretical capacity) to be completely discharged in 10 hours, and 0.05 C is a value of a current that causes the battery capacity to be completely discharged in 20 hours.

In this manner, a film was formed on the surface of, for example, the negative electrode 22, and the state of the secondary battery was thus stabilized. As a result, the secondary battery of the laminated-film type was completed.

[Fabrication of Comparative Secondary Battery]

For comparison, secondary batteries were fabricated by a similar procedure except that, in the fabrication process of the wound body, the positive electrode 21, the negative electrode 22, and the separator 23 were wound in such a manner that the separator 23 was disposed in the outermost wind.

For comparison, secondary batteries were fabricated by a similar procedure except that an adhesive film was used instead of the adhesive tape 50. The adhesive film had a configuration similar to the configuration of the adhesive tape 50 except that the adhesive film did not include the non-heat adhesive layer 51. More specifically, the adhesive film was an oriented polystyrene film (a so-called OPS (registered trademark) film). In this case, the adhesive film (the oriented polystyrene film) was subjected to heating and pressure application to thereby cause the adhesive film to be adhered to each of the outer package film 10 and the battery device 20.

In addition, the completed secondary battery was disassembled to thereby collect the adhesive tape 50 adhered to each of the outer package film 10 and the battery device 20, following which an adhesive strength (gf) of the outer package film 10 adhered to the battery device 20 via the adhesive tape 50 was measured. In this case, a 180° peel test (at a tensile rate of 5 mm/sec) was performed using the outer package film 10 (having a width of 19 mm and a length of 75 mm).

TABLE 1

| | Adhesive tape | | | | | Battery device | | | | |
|---|---|---|---|---|---|---|---|---|---|---|
| | Non-heat adhesive layer | | Heat adhesive layer | | | | Active material layer (Outer side of winding) | Active material layer (Inner side of winding) | | |
| | Kind | Object to be adhered | Kind | Object to be adhered | Adhesive film | Outermost wind | | | Adhesion strength (gf) | Number of times of endurance (times) |
| Example 1 | Rubber-based adhesive | Outer package film | Oriented polystyrene | Battery device | — | Positive electrode | No | Yes | ≥800 | ≥700 |
| Example 2 | Rubber-based adhesive | Outer package film | Oriented polystyrene | Battery device | — | Negative electrode | No | Yes | ≥800 | ≥700 |
| Example 3 | Rubber-based adhesive | Outer package film | Oriented polystyrene | Battery device | — | Positive electrode | No | No | 560 | 450 |
| Example 4 | Rubber-based adhesive | Outer package film | Oriented polystyrene | Battery device | — | Negative electrode | No | No | 540 | 400 |
| Comparative example 1 | Rubber-based adhesive | Battery device | Oriented polystyrene | Outer package film | — | Positive electrode | No | Yes | 430 | 250 |
| Comparative example 2 | Rubber-based adhesive | Battery device | Oriented polystyrene | Outer package film | — | Negative electrode | No | Yes | 410 | 250 |
| Comparative example 3 | Rubber-based adhesive | Battery device | Oriented polystyrene | Outer package film | — | Separator | — | — | 11 | 100 |
| Comparative example 4 | Rubber-based adhesive | Outer package film | Oriented polystyrene | Battery device | — | Separator | — | — | 10 | 100 |
| Comparative example 5 | — | — | — | — | Oriented polystyrene | Positive electrode | No | Yes | 15 | 50 |
| Comparative example 6 | — | — | — | — | Oriented polystyrene | Negative electrode | No | Yes | 13 | 50 |

Evaluation of performance (physical durability) of the secondary batteries revealed the results presented in Table 1.

In a case of evaluating the physical durability, a drop test of the secondary battery was carried out in accordance with JIS 60068-2-31:2013 (Environmental testing—Electric & Electronics—Part 2-31: Drop and topple test), except that a drop height of Free fall test—Procedure 2 (repeated) was changed to 1000 mm, to thereby check a state of the secondary battery after the drop test.

In this case, a work of performing 50 times the drop test and thereafter checking the state of the secondary battery was repeated to examine the maximal number of drops (the number of times of endurance (times)) at which the secondary battery maintained its normal state without being damaged. In a case of checking the state of the secondary battery, it was determined that the secondary battery had been damaged in any of the following cases: a case where the voltage of the secondary battery decreased as compared to the voltage of the secondary battery before the drop test; a case where the voltage of the secondary battery became unmeasurable; or a case where 1 kHz impedance of the secondary battery rose markedly.

As described in Table 1, the physical durability of the secondary battery greatly varied depending on a condition of adhesion between the outer package film and the battery device.

Specifically, in a case where the positive electrode 21 or the negative electrode 22 was disposed in the outermost wind, and where the adhesive tape 150 in which the non-heat adhesive layer 51 was adhered to the battery device 20 and the heat adhesive layer 52 was adhered to the outer package film 10 was used (Comparative examples 1 and 2), the adhesive strength decreased, and the number of times of endurance thus also decreased.

In a case where the separator 23 of the stacked type was disposed in the outermost wind, and where the adhesive tape 150 in which the non-heat adhesive layer 51 was adhered to the battery device 20 (or the outer package film 10) and the heat adhesive layer 52 was adhered to the outer package film 10 (or the battery device 20) was used (Comparative examples 3 and 4), the adhesive strength decreased markedly due to the fact that the polymer compound layer peeled off from the porous layer, and the number of times of endurance thus decreased markedly.

Note that, in a case where the adhesive film was used (Comparative examples 5 and 6), a result was substantially similar to that of the case where the separator 23 was disposed in the outermost wind (Comparative examples 3 and 4). That is, the adhesive strength decreased markedly, and the number of times of endurance thus decreased markedly.

In contrast, in a case where the positive electrode 21 or the negative electrode 22 was disposed in the outermost wind, and where the adhesive tape 50 in which the non-heat adhesive layer 51 was adhered to the outer package film 10 and the heat adhesive layer 52 was adhered to the battery device 20 was used (Examples 1 to 4), the adhesive strength increased, and the number of times of endurance thus also increased.

In this case, in particular, if the positive electrode active material layer 21B was provided on the surface F2 on the inner side of the winding in the positive electrode 21 of the outermost wind (Example 1), the adhesive strength increased and the number of times of endurance thus also increased, as compared with a case where no positive electrode active material layer 21B was provided on the surface F2 on the inner side of the winding in the positive electrode 21 of the outermost wind (Example 3).

Similarly, if the negative electrode active material layer 22B was provided on the surface F2 on the inner side of the winding in the negative electrode 22 of the outermost wind (Example 2), the adhesive strength increased and the number of times of endurance thus also increased, as compared with a case where no negative electrode active material layer 22B was provided on the surface F2 on the inner side of the winding in the negative electrode 22 of the outermost wind (Example 4).

Based upon the results presented in Table 1, the adhesive strength increased and the number of times of endurance thus also increased in a case where: the battery device 20 including the positive electrode 21 and the negative electrode 22 that were opposed to each other and were wound was contained inside the outer package film 10 having flexibility; the adhesive tape 50 was adhered to each of the outer package film 10 and the battery device 20; the positive electrode 21 and the negative electrode 22 were wound in such a manner that the positive electrode 21 or the negative electrode 22 was disposed in the outermost wind; and the adhesive tape 50 included the non-heat adhesive layer 51 adhered to the outer package film 10 and the heat adhesive layer 52 (oriented polystyrene) adhered to the battery device 20. Accordingly, the secondary battery achieved superior physical durability.

Although the present technology has been described herein according to an embodiment, the configuration of the present technology is not limited thereby, and is therefore modifiable in a variety of suitable ways.

For example, although the description has been given of the case where the electrode reactant is lithium, the electrode reactant is not particularly limited. Thus, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an outer package member having flexibility;
a battery device contained inside the outer package member, the battery device including a positive electrode and a negative electrode, the positive electrode and the negative electrode being opposed to each other and being wound; and
an adhesive member disposed between the outer package member and the battery device, the adhesive member being adhered to each of the outer package member and the battery device, wherein
the positive electrode and the negative electrode are wound in such a manner that the positive electrode or the negative electrode is disposed in an outermost wind, and
the adhesive member includes
a non-heat adhesive layer that is adhered to the outer package member wherein the non-heat adhesive layer includes a rubber-based adhesive, and
a heat adhesive layer that is adhered to the battery device and includes oriented polystyrene.

2. The secondary battery according to claim 1, wherein the adhesive member comprises an oriented polystyrene tape.

3. The secondary battery according to claim 1, wherein
the battery device has an elongated shape, and has
two flat surfaces that are opposed to each other and
two curved surfaces that are opposed to each other with the two flat surfaces in between, and
the adhesive member is adhered to the flat surface.

4. The secondary battery according to claim 1, wherein
the positive electrode and the negative electrode are wound in such a manner that the positive electrode is disposed in the outermost wind,
the positive electrode includes
a positive electrode current collector having a surface on an outer side of winding and a surface on an inner side of the winding, and
a positive electrode active material layer provided on each of the surface on the outer side of the winding and the surface on the inner side of the winding, and,
in the positive electrode of the outermost wind, the positive electrode active material layer is not provided on the surface on the outer side of the winding of the positive electrode current collector, and the positive electrode current collector is exposed.

5. The secondary battery according to claim 4, wherein, in the positive electrode of the outermost wind, the positive electrode active material layer is provided on the surface on the inner side of the winding of the positive electrode current collector.

6. The secondary battery according to claim 1, wherein
the positive electrode and the negative electrode are wound in such a manner that the negative electrode is disposed in the outermost wind,
the negative electrode includes
a negative electrode current collector having a surface on an outer side of winding and a surface on an inner side of the winding, and a negative electrode active material layer provided on each of the surface on the outer side of the winding and the surface on the inner side of the winding, and, in the negative electrode of the outermost wind, the negative electrode active material layer is not provided on the surface on the outer side of the winding of the negative electrode current collector, and the negative electrode current collector is exposed.

7. The secondary battery according to claim 6, wherein, in the negative electrode of the outermost wind, the negative electrode active material layer is provided on the surface on the inner side of the winding of the negative electrode current collector.

8. The secondary battery according to claim 1, wherein the secondary battery comprises a lithium-ion secondary battery.

9. The secondary battery according to claim 1, wherein the non-heat adhesive layer and the heat adhesive layer are applied to a bottom surface of the outer package.

10. The secondary battery according to claim 1, wherein the adhesive member is applied to a flat surface of the battery device.

11. The secondary battery according to claim 1, wherein the battery device comprises a positive electrode lead, a negative electrode lead, and at least one film.

\* \* \* \* \*